United States Patent
Kunc et al.

(10) Patent No.: US 10,137,617 B2
(45) Date of Patent: Nov. 27, 2018

(54) LOW SHEAR PROCESS FOR PRODUCING POLYMER COMPOSITE FIBERS

(71) Applicant: UT-Battelle, LLC, Oak Ridge, TN (US)

(72) Inventors: Vlastimil Kunc, Knoxville, TN (US); Chad E. Duty, Knoxville, TN (US); Lonnie J. Love, Knoxville, TN (US); Amit K. Naskar, Knoxville, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 319 days.

(21) Appl. No.: 14/689,466

(22) Filed: Apr. 17, 2015

(65) Prior Publication Data
US 2016/0303779 A1    Oct. 20, 2016

(51) Int. Cl.
*B29C 45/00* (2006.01)
*B33Y 70/00* (2015.01)
(Continued)

(52) U.S. Cl.
CPC ...... *B29C 45/0001* (2013.01); *B29C 47/0004* (2013.01); *B29C 47/0021* (2013.01); *B29C 47/0057* (2013.01); *B29C 47/065* (2013.01); *B29C 47/56* (2013.01); *B29C 64/106* (2017.08); *B29C 64/165* (2017.08); *B32B 27/08* (2013.01); *B33Y 70/00* (2014.12); *D06M 10/00* (2013.01);
(Continued)

(58) Field of Classification Search
CPC ................................................. B29C 47/0038
See application file for complete search history.

(56) References Cited

U.S. PATENT DOCUMENTS

| 4,393,020 A | 7/1983 | Li et al. |
| 5,811,040 A | 9/1998 | Mallonee |

(Continued)

FOREIGN PATENT DOCUMENTS

| CN | 104479282 A | 4/2015 |
| EP | 1 651 806 B1 | 1/2012 |
| JP | H 07-314441 A | 12/1995 |

OTHER PUBLICATIONS

Ogawa JP07-314441 May 1995 Eng machine translation (Year: 1995).*

(Continued)

*Primary Examiner* — Joseph A Miller, Jr.
(74) *Attorney, Agent, or Firm* — Scully Scott Murphy & Presser (57) ABSTRACT

A method for producing a polymer composite fiber comprised of a polymer matrix with filaments incorporated therein whose lengthwise dimensions are substantially oriented with the axial dimension of the composite fiber, the method comprising subjecting a melt comprised of a polymer matrix and filaments to an extrusion process in which the melt is extruded into a fibrous form in the absence of screw extruders and in the substantial absence of shear forces that result in breakage of the filaments, followed by cooling and solidification of the extruded melt to provide the polymer composite fiber. Integration of these polymer composite fibers with additive manufacturing technologies, particularly rapid prototyping methods, such as FFF and 3D printing, are also described. The resulting polymer composite fibers and articles made thereof are also described.

20 Claims, 3 Drawing Sheets

(51) Int. Cl.
| | |
|---|---|
| *B29C 47/56* | (2006.01) |
| *B29C 47/00* | (2006.01) |
| *B29C 47/06* | (2006.01) |
| *B32B 27/08* | (2006.01) |
| *D06M 10/00* | (2006.01) |
| *B29C 64/106* | (2017.01) |
| *B29C 64/165* | (2017.01) |
| *B29C 35/02* | (2006.01) |
| *B29K 67/00* | (2006.01) |

(52) U.S. Cl.
CPC .... *B29C 35/02* (2013.01); *B29C 2947/92704* (2013.01); *B29C 2947/92942* (2013.01); *B29K 2067/046* (2013.01)

(56) References Cited

U.S. PATENT DOCUMENTS

| | | | |
|---|---|---|---|
| 6,162,536 A * | 12/2000 | Montsinger | B29B 9/14 264/171.13 |
| 7,897,248 B2 | 3/2011 | Barrera et al. | |
| 9,096,955 B2 | 8/2015 | Naskar et al. | |
| 2001/0008322 A1* | 7/2001 | Rosenbaum | B29B 17/0042 264/267 |
| 2006/0137799 A1* | 6/2006 | Haque | B32B 5/06 156/62.2 |
| 2007/0228590 A1* | 10/2007 | LaBossiere | B29C 67/0055 264/40.1 |
| 2010/0021679 A1 | 1/2010 | Robert | |
| 2011/0277926 A1* | 11/2011 | Polk, Jr. | B29C 43/04 156/245 |
| 2014/0232035 A1* | 8/2014 | Bheda | B29C 67/0088 264/148 |
| 2014/0306364 A1 | 10/2014 | Naskar | |
| 2015/0057784 A1* | 2/2015 | Butler | B29C 67/0088 700/119 |

OTHER PUBLICATIONS

Straat, M., et al., "Conducting Bicomponent Fibers Obtained by Melt Spinning of PA6 and Polyolefins Containing High Amounts of Carbonaceous Fillers", Journal of Applied Polymer Science, (2012), vol. 123, pp. 936-943.

Tekinalp, H.L., et al., "Highly oriented carbon fiber-polymer composites via additive manufacturing", Composites Science and Technology, (2014), vol. 105, pp. 144-150.

Yuan, X., et al., "Characterization of Poly(L-Lactic acid) Fibers Produced by Melt Spinning", Journal of Applied Polymer Science, (2001), vol. 81, pp. 251-260.

International Search Report dated Aug. 11, 2016 issued in PCT/US2016/027024.

* cited by examiner

LOW SHEAR PROCESS FOR PRODUCING POLYMER COMPOSITE FIBERS

This invention was made with government support under Prime Contract No. DE-AC05-00OR22725 awarded by the U.S. Department of Energy. The government has certain rights in the invention.

FIELD OF THE INVENTION

The present invention relates generally to polymer composite fiber compositions in which the fiber contains a polymer component and filler particles incorporated therein. The invention more particularly relates to such fiber compositions having characteristics particularly suited for their use in structural applications, such as high tensile strength and structural uniformity. The invention further relates to methods for producing such fiber compositions, and also relates to methods of use for producing various structures, such as by additive manufacturing, or more particularly, rapid prototyping, such as fused deposition modeling (FDM) through fused filament fabrication (FFF)

BACKGROUND OF THE INVENTION

Rapid prototyping (RP) is a technology in which a part can be built layer by layer to a desired geometry, typically based on the instructions of a computer program, such as computer-aided design (CAD). Using RP, complex parts can be built with great precision and in short timeframes. In particular, a leading RP technique known as "fused filament fabrication" (FFF) can produce detailed and complex structures by its layer-by-layer process in which a fibrous material is extruded through a nozzle and deposited in a raster pattern (i.e., a pattern composed of parallel lines) in each layer. There has been significant interest in the use of these additive technologies to advance the manufacturing industry.

However, because only a limited number of materials, such as a limited number of thermoplastics and some engineering plastics, have been used as a feedstock for FFF, the final products generally have limited mechanical properties. In an effort to improve the mechanical properties, the conventional art has included reinforcing particles (i.e., fillers) with the polymer. The conventional means in the art for incorporating such filler material into a polymer matrix is by high shear mixing or compounding processes, typically provided by a screw extruder device, which is commonly either a single or twin screw extruder. However, a significant problem encountered with the high shear mixing processes of the art, particularly for filamentous particles, is filament breakage, which may occur by, for example, direct contact of the filaments with the screw and by filament-filament grinding. As the resulting filament breakage significantly undermines the original purpose of including the filament (i.e., improving tensile strength), current efforts in the conventional art for improving tensile strength and other characteristics of importance to rapid prototyping remain deficient.

SUMMARY OF THE INVENTION

The instant disclosure is directed to methods for producing polymer composite fibers suitable for integration with rapid prototyping methods and which overcome many of the obstacles found in the conventional art including lower than optimal tensile strength, uniformity in thickness (i.e., diameter), surface roughness, and dimensional stability. As an advance over the conventional art, the instantly disclosed polymer composite fiber possesses a high level of tensile strength suited for structural applications and also advantageously displays a substantial uniformity in its diameter and surface smoothness. The described method confers these advantageous properties by extruding a melt of polymer and filamentous particles (i.e., "filaments") through a low-shear extrusion process in which screw extruders are absent. The low-shear screwless extrusion process described herein significantly reduces the amount of filament breakage, thereby advantageously retaining a much higher level of tensile strength in the resulting composite fiber. The described method furthermore generally confers a substantial degree of structural order in the composite fiber, particularly an alignment of the lengthwise dimensions of the filaments in the axial direction of the composite fiber. This structural order further improves the tensile strength and also improves uniformity in the fiber thickness and smoothness of the fiber surface.

In particular embodiments, the method includes subjecting a melt containing a polymer matrix and filaments to an extrusion process in which the melt is extruded into a fibrous form in the absence of screw extruders and in the substantial absence of shear forces that could result in breakage of the filaments, followed by cooling and solidification of the extruded melt to provide the polymer composite fiber. In more particular embodiments, the method employs a screwless melt spinning process or a process in which the melt is pushed through a die by means of a plunger that moves at a substantially fixed speed to provide a substantially constant pressure on the melt moving through the die. The described screwless extrusion process substantially minimizes shear forces on the melt to result in significantly minimized filament breakage, high tensile strength, thickness uniformity and surface smoothness.

The instant disclosure is also directed to the composite fiber produced by the above-described process and to structures (objects or articles) made therefrom. The instant disclosure is also directed to an additive manufacturing process, or more particularly, a rapid prototyping process or FFF process (e.g., a 3D printing process) in which the composite fibers are integrated to form objects therefrom.

DETAILED DESCRIPTION OF THE INVENTION

In the disclosed process, a melt containing at least a polymer matrix and filamentous particles (i.e., filaments) incorporated therein is subjected to a low-shear extrusion process to minimize breakage of the filaments during extrusion. The low-shear extrusion process is herein defined as an extrusion process in which the melt is extruded into a fibrous form in the substantial absence of shear forces that result in breakage of the filaments. Since screw extruders employ shear forces high enough to break filaments, the process disclosed herein excludes the use of screw extruders.

In a first particular embodiment, the process employs a screwless melt spinning process to form the polymer composite fiber (i.e., fiber-shaped extrudate) from the melt. The apparatus and conditions used in such melt spinning processes are well known in the art, except that for the instant purposes conditions are adjusted, if necessary, to ensure a substantial absence of shear forces high enough to result in filament breakage. Generally, as well known in the art, the screwless melt spinning process includes a step in which a heated melt is extruded through a die at a controlled extrusion rate by means of a spinneret, and the resulting extruded fibrous form of the melt cooled to solidify the fibrous melt to form the composite fiber. For purposes of the instant invention, the extrusion (flow) rate, which is governed by the spinneret speed, is generally maintained at up to or less than 100, 50, 25, 20, 15, 10, 5, 2, 1, 0.1, or 0.01 m/min (meters per minute).

Figure 1:
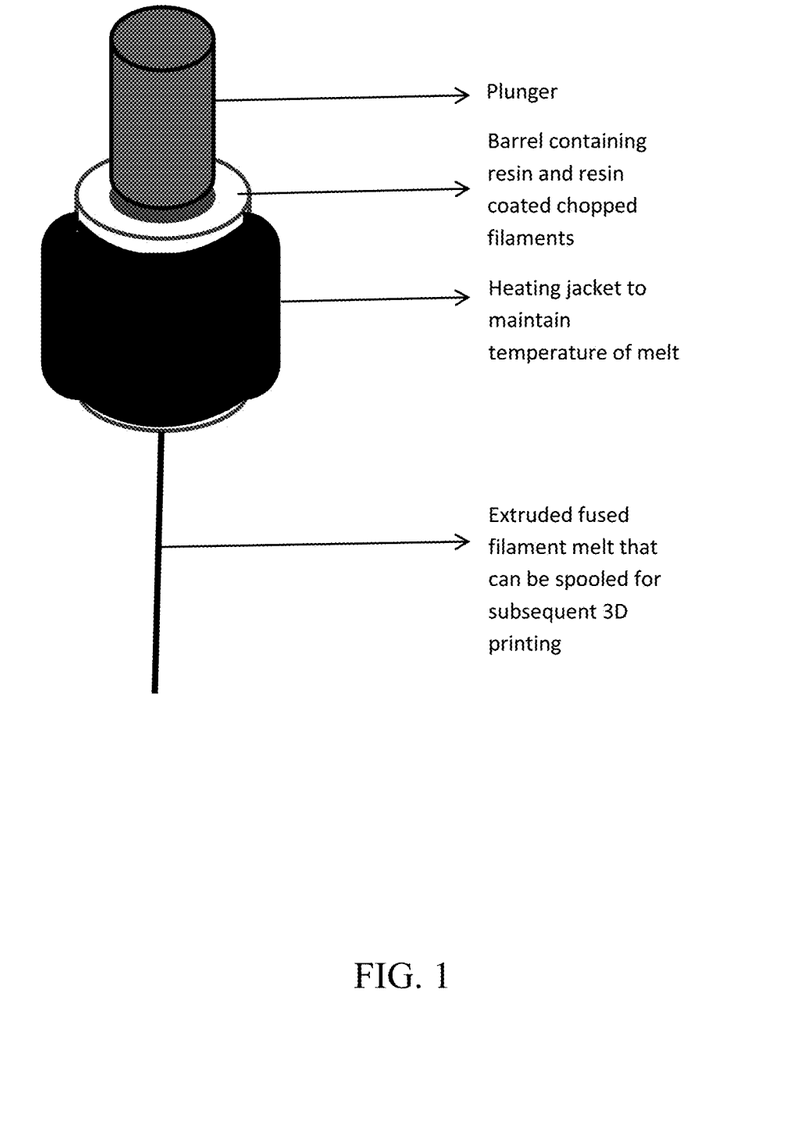
FIG. 1. Schematic of a screwless low-shear barrel-plunger extrusion of fused filament matrix for subsequent 3D printing process.

In a second particular embodiment, the process employs a plunger system in which the melt is extruded by pushing the heated melt through a die by means of a plunger (typically, motorized) that moves at a substantially fixed speed to provide a substantially constant pressure on the melt moving through the die to form the polymer composite fiber from the melt. The melt is held within a container (e.g., a syringe) having an outlet fitted with a die, and the plunger pushes the melt through the container and die. As in the melt spinning process, the resulting extruded fibrous form of the melt is cooled to solidify the fibrous melt into the composite fiber. For purposes of the invention, the substantially fixed speed of the plunger is preferably no more than or less than, for example, 25, 10, 5, 1, 0.1, or 0.01 mm/min. For purposes of the invention, the substantially fixed pressure is preferably no more than or less than, for example, 3000, 2000, 1000, 500, or 100 psi. A typical device of such barrel and plunger type extrusion of continuous fused filament composite is shown in FIG. 1.

The melt containing polymer matrix and filaments can be produced by any of the means known in the art, except that the means for producing the melt is modified, if necessary, to minimize or even prevent filament breakage. In particular embodiments, the melt is produced by a process in which polymer matrix material is melted, either in the presence or absence of the filaments. The filaments may be admixed with the polymer during the melting process, or the filaments may be admixed with the polymer after the polymer has been melted. To form the melt, the polymer is heated to at least its melting point and below any degradation point.

The polymer in the melt necessarily possesses a thermoplastic property in order that it can be melted, extruded, and solidified upon cooling. The term "polymer", as used herein, is meant to encompass homopolymers and copolymers, wherein the term "copolymer" herein refers to polymers having two or more different types of monomer units. The copolymer can be, for example, a strict copolymer having only two different types of monomer units, or a terpolymer, tetrapolymer, or higher copolymer. Moreover, the copolymer can have any suitable arrangement, such as block, alternating, periodic, random, linear, branched, or graft copolymer arrangement. In particular embodiments, the polymer, in the solid state and in the absence of reinforcing particles, is useful as a structural material with acceptable tensile strength, e.g., at least or above 5, 10, 20, 50, 100, 150, 200, 250, 300, or 350 MPa (as ultimate strength or yield strength). In other embodiments, the polymer in the solid state would not ordinarily achieve such acceptable tensile strengths by itself, but achieves such tensile strengths when admixed with filaments introduced during production of the melt.

The polymer can have any suitable weight-average molecular weight ($M_w$), such as precisely, about, at least, above, up to, or less than, for example, 10,000,000 g/mol, 5,000,000 g/mol, 1,000,000 g/mol, 500,000 g/mol, 400,000 g/mol, 300,000 g/mol, 200,000 g/mol, 100,000 g/mol, 50,000 g/mol, 10,000 g/mol, 5,000 g/mol, 2,500 g/mol, 2,000 g/mol, 1,500 g/mol, 1,000 g/mol, 500 g/mol, 250 g/mol, 200 g/mol, 150 g/mol, or 100 g/mol, or a $M_w$ within a range bounded by any two of the foregoing exemplary values. The polymer may also independently have any suitable number-average molecular weight $M_n$. As used herein, the term "about" generally indicates within ±0.5, 1, 2, 5, or 10% of the indicated value. For example, in its broadest sense, the phrase "about 100 g/mol" can mean 100 g/mol±10%, which indicates 100±20 g/mol or 90-110 g/mol.

The polymer can be any of the thermoplastic polymers known in the art, such as, for example, a polyamide, polyester (or biopolyester, such as polytrimethylene terephthalate, sometimes referred to by the trade name Sorona™), polyacrylonitrile (PAN), polyolefin, lignin, polycarbonate, polystyrene, polybutadiene, polyether, polybenzimidazole, viscose, rayon, pitch, or combination thereof. In one instance, a combination of polymers refers to a copolymer of any of the recited polymers. In another instance, a combination of polymers refers to a physical blend of any of the recited polymers or copolymers thereof. Some examples of polyamide polymers include polyamide 6 (i.e., PA6 or Nylon 6), polyamide 6,6 (Nylon 6-6), polyphthalamide (PPA), aramids (e.g., Kevlar®), and combinations thereof. Some examples of polyester polymers include polyethylene terephthalate (PET), polyethylene naphthalate (PEN), polyethylene furanoate (PEF), polycyclohexylenedimethylene terephthalate (PCT or PCDT), polylactic acid (PLA), polyglycolic acid (PGA), polycaprolactone (PCL), polyhydroxyalkanoate (PHA), polybutylene succinate (PBS), poly (ethylene succinate), poly(3-hydroxybutyrate-co-3-hydroxyvalerate (PHBV), polybutylene terephthalate, and combinations thereof. The term "polyolefin", as used herein, refers to polyvinyl polymers having pendant groups selected from hydrogen atom, alkyl groups, and/or halogen atoms. Some examples of polyolefins include polyethylene, polypropylene, polybutylene, polytetrafluoroethylene (PTFE), polyvinylidene fluoride (PVDF), polyvinyl fluoride (PVF), polyvinyl chloride (PVC), poly(methyl methacrylate), polybutadiene, polyvinylacetate, and combinations thereof. Some examples of polyethers include polyether ether ketone (PEEK), polyoxymethylene (POM, also known as polyacetal), poly(p-phenylene oxide) (i.e., poly(p-phenylene ether) or PPE), polysulfone (e.g., polyethersulfone or polyphenylsulfone), polyetherimide (PEI), and combinations thereof.

In the case of the polymer being polyacrylonitrile, the PAN polymer may, in some embodiments, be a homopolymer of PAN (i.e., with only acrylonitrile pendant group). However, PAN is often in the form of a copolymer, such as a PAN-acrylate copolymer. The acrylate component may be selected from, for example, methyl acrylate, ethyl acrylate, propyl acrylate, butyl acrylate, methylmethacrylate, (2-hydroxyethylacrylate), vinyl acetate, acrylic acid, methacrylic acid, and itaconic acid. Other copolymers of PAN include, for example, styrene-acrylonitrile (SAN), acrylonitrile-butadiene-styrene (ABS), polybutadiene-acrylic acid-acrylonitrile terpolymer (PBAN), and acrylonitrile styrene acrylate (ASA).

The filaments can be composed of any material that confers additional tensile strength to the polymer on solidification. The filaments can be composed of, for example, carbon, metal oxide, or metal. The term "filament", as used herein, refers to a particle, typically of no more than 10 mm in length, having a length dimension at least ten times its width dimension, which corresponds to an aspect ratio (i.e., length over width) of at least or above 10:1 (i.e., an aspect ratio of at least 10). In different embodiments, the filament has an aspect ratio of at least or above 10, 20, 50, 100, 250, 500, 1000, or 5000. In different embodiments, the filament can have a length of at least, above, up to, or less than, for example, 10 nm, 50 nm, 100 nm, 200 nm, 500 nm, 1000 nm (1 µm), 2 µm, 5 µm, 10 µm, 20 µm, 50 µm, 100 µm, 200 µm, 500 µm, 1000 µm (1 mm), 2 mm, 5 mm, or 10 mm, or a length within a range bounded by any two of the foregoing values. The filament can have a diameter of at least, above, up to, or less than, for example, 10 nm, 20 nm, 50 nm, 75 nm, 100 nm, 200 nm, 500 nm, 1 µm, 2 µm, 5 µm, 6 µm, 7 µm, 10 µm, 20 µm, 50 µm, 100 µm, or 200 µm, or a diameter within a range bounded by any two of the foregoing values, provided that the filament possesses an aspect ratio of at least 10. In some embodiments, the term "filament" refers only to particles having one dimension at least ten times greater than the other two dimensions. In other embodiments, the term "filament" also includes particles having two of its dimensions at least ten times greater than the remaining dimension, which corresponds to a platelet morphology.

The carbon filaments can be, for example, carbon fibers, carbon nanotubes, platelet nanofibers, graphene nanoribbons, or a mixture thereof. In the case of carbon fibers, these can be any of the high-strength carbon fiber compositions known in the art. Some examples of carbon fiber compositions include those produced by the pyrolysis of polyacrylonitrile (PAN), viscose, rayon, lignin, pitch, or polyolefin. The carbon nanofibers may also be vapor grown carbon nanofibers. In some embodiments, the carbon fiber is in the form of a single carbon strand; however, in more typical embodiments, the carbon fiber is in the form of a tow that contains a multiplicity of carbon strands in a bundle. The carbon fibers can be micron-sized carbon fibers, generally having inner or outer diameters of 1-20 microns or sub-range therein, or carbon nanofibers, generally having inner or outer diameters of 10-1000 nm or sub-range therein. In the case of carbon nanotubes, these may be any of the single-walled or multi-walled carbon nanotubes known in the art, any of which may or may not be heteroatom-doped, such as with nitrogen, boron, oxygen, sulfur, or phosphorus. In other embodiments, the carbon fibers may be diamond nanothreads, as described, for example, in T. C. Fitzgibbons, et al., "Benzene-derived carbon nanothreads", *Nature Materials,* 14, 43-47 (2015), the contents of which are herein incorporated by reference. In the case of platelet carbon nanofibers, these can have an approximately rectangular platelet morphology with 1-100 micron length, as described, for example, in R. Zheng, et al., "Preparation, characterization and growth mechanism of platelet carbon nanofibers", *Carbon,* vol. 44, no. 4, pp. 742-746 (April 2006), the contents of which are herein incorporated by reference. In the case of graphene nanoribbons, these refer to free standing layers of graphene or graphene oxide with ultra-thin widths of generally less than 10, 5, 2, or 1 nm, as described, for example, in P. Han, et al., *ACS Nano,* 8(9), pp. 9181-9187, 2014 and Z. J. Qi, et al., *Nano Lett.,* 14(8), pp. 4238-4244 (2014), the contents of which are herein incorporated by reference. The carbon filament, particularly the carbon fiber, considered herein preferably possesses a high tensile strength, such as at least 500, 1000, 2000, 3000, 5000, or 10,000 MPa. In some embodiments, the carbon filament, particularly the carbon fiber, possesses a degree of stiffness of the order of steel or higher (e.g., 100-1000 GPa) and/or an elastic modulus of at least 50 Mpsi or 100 Mpsi.

In some embodiments, the carbon filaments are made exclusively of carbon, while in other embodiments, the carbon filaments can include an amount of one or a combination of non-carbon non-hydrogen (i.e., hetero-dopant) elements, such as nitrogen, oxygen, sulfur, boron, silicon, phosphorus, or a metal, such as an alkali metal (e.g., lithium), alkaline earth metal, transition metal, main group metal (e.g., Al, Ga, or In), or rare earth metal. Some examples of binary carbon compositions include silicon carbide (SiC) and tungsten carbide (WC). The amount of hetero element can be a minor amount (e.g., up to 0.1, 0.5, 1, 2, or 5 wt % or mol %) or a more substantial amount (e.g., about, at least, or up to 10, 15, 20, 25, 30, 40, or 50 wt % or mol %).

The metal oxide filaments (also known as metal oxide nanowires, nanotubes, nanofibers, or nanorods) can be, for example, those having or including a main group metal oxide composition, wherein the main group metal is generally selected from Groups 13 and 14 of the Periodic Table. Some examples of Group 13 oxides include aluminum oxide, gallium oxide, indium oxide, and combinations thereof. Some examples of Group 14 oxides include silicon oxide (e.g., glass), germanium oxide, tin oxide, and combinations thereof. The main group metal oxide may also include a combination of Group 13 and Group 14 metals, as in indium tin oxide. In other embodiments, the metal oxide filaments have or include a transition metal oxide composition, wherein the transition metal is generally selected from Groups 3-12 of the Periodic Table. Some examples of transition metal oxides include scandium oxide, yttrium oxide, titanium oxide, zirconium oxide, hafnium oxide, vanadium oxide, niobium oxide, tantalum oxide, chromium oxide, molybdenum oxide, tungsten oxide, manganese oxide, iron oxide, ruthenium oxide, cobalt oxide, rhodium oxide, iridium oxide, nickel oxide, palladium oxide, copper oxide, zinc oxide, and combinations thereof. The metal oxide filament may also include a combination of main group and transition metals. The metal oxide filament may also include one or more alkali or alkaline earth metals in addition to a main group or transition metal, as in the case of some perovskite nanowires, such as $CaTiO_3$, $BaTiO_3$, $SrTiO_3$, and $LiNbO_3$ nanowires, and as further described in X. Zhu, et al., *J. Nanosci. Nanotechnol.,* 10(7), pp. 4109-4123, July 2010, and R. Grange, et al., *Appl. Phys. Lett.,* 95, 143105 (2009), the contents of which are herein incorporated by reference. The metal oxide filament may also have a spinel composition, as in $Zn_2TiO_4$ spinel nanowires, as described in Y. Yang et al., *Advanced Materials,* vol. 19, no. 14, pp. 1839-1844, July 2007, the contents of which are herein incorporated by reference. In some embodiments, the metal oxide filaments are constructed solely of metal oxide, whereas in other embodiments, the metal oxide filaments are constructed of a coating of a metal oxide on a non-metal oxide filament, e.g., silica-coated or germanium oxide-coated carbon nanotubes, as described in M. Pumera, et al., *Chem Asian J.,* 4(5), pp. 662-667, May 2009, and M. Pumera, et al., *Nanotechnology,* 20(42), 425606, 2009, respectively, the contents of which are herein incorporated by reference. The metal oxide layer may alternatively be disposed on the surface of a metallic filament. The metal oxide filaments may also have any of the lengths and diameters described above.

The metal filaments (also known as metal nanowires, nanotubes, nanofibers, or nanorods) can be, for example, those having or including a main group metal composition, such as a silicon, germanium, or aluminum composition, all of which are well known in the art. The metal filaments can also have a composition having or including one or more transition metals, such as nickel, cobalt, copper, gold, palladium, or platinum nanowires, as well known in the art. The metal filaments may also be doped with one or more non-metal dopant species, such as nitrogen, phosphorus, arsenic, or silicon to result in a metal nitride, metal phosphide, metal arsenide, or metal silicide composition. Many of these doped metal compositions are known to have semiconductive properties. For example, the metal filaments may have a gallium nitride composition, as described, for example, in J. Goldberger, et al., *Nature*, vol. 422, pp. 599-602, April 2003, the contents of which are herein incorporated by reference. As well known in the art, the semiconducting nanowires may alternatively have an indium phosphide, gallium arsenide, gallium phosphide, silicon nitride, or boron nitride composition. The metal filaments may also have any of the lengths and diameters described above.

The amount (i.e., weight percent, or "wt %") of filament with respect to the weight of polymer can be any suitable amount, typically at least 1 wt % and up to 40 wt %, or more typically at least 5 wt % and up to 35 wt %, or even more typically, at least 10 wt % and up to 30 wt %. In different embodiments, the filament can be in an amount of precisely, about, at least, above, up to, or less than, for example, 1 wt %, 2 wt %, 5 wt %, 10 wt %, 12 wt %, 15 wt %, 20 wt %, 25 wt %, 30 wt %, 35 wt %, or 40 wt %, or in an amount within a range bounded by any two of the foregoing values.

In some embodiments, the filaments are coated with a sizing agent, which can be any of the sizing agents well known in the art for improving the interfacial bonding of particles with a polymeric matrix. The sizing agent may be, for example, an epoxy-based (i.e., epoxy-containing) sizing agent, vinyl-containing sizing agent, hydroxy-containing (e.g., phenolic-containing) sizing agent, carboxy or carboxy ester sizing agent, or amino-containing sizing agent. In the case of an epoxy sizing agent, the epoxy composition is typically a resin, which may be, for example, a bifunctional, trifunctional, tetrafunctional, or higher functional epoxy resin. In other embodiments, the sizing agent may have any of the polymeric compositions described above for the polymer matrix. The sizing agent may be the same or different in composition from the polymer matrix. For example, the sizing agent may be based on polyetherimide (PEI) to improve the interface between filaments and a thermoplastic matrix such as PEEK, as described in I. Giraud, et al., *Applied Surface Science*, vol. 266, pp. 94-99 (February 2013), the contents of which are herein incorporated by reference.

In the method for producing the polymer composite fiber, a melt containing the polymer and filaments admixed therein is first obtained by appropriate heating of the polymer to at least its melting point so that the polymer melt is suitably flowable. The filaments may be admixed with chunks or particles of the polymer during the heating process, or the polymer may be first heated and melted in the absence of the filaments, followed by addition of the filaments and mixing. In some embodiments, the melt includes only the polymer and filaments in the absence of other components.

Before extrusion, the melt is mixed (i.e., compounded) in a manner that results in a homogeneous blend of the polymers and filaments. The term "homogeneous blend", as used herein, indicates, at minimum, a substantially or completely uniform dispersion or distribution of filaments in the polymer matrix. In the event of more than one polymer included in the melt, the term "homogeneous blend" typically also indicates that the two or more polymers are integrated to the extent that no discrete regions of isolated polymer remain on the microscale (typically at 10, 50, or 100 µm). Nevertheless, the instant disclosure includes the possibility that a certain level of polymeric heterogeneity may be desirable for certain applications. The components can be homogeneously blended by any of the methodologies known in the art for achieving homogeneous blends of solid, semi-solid, gel, paste, or liquid mixtures, except that the blending method is appropriately selected or modified to substantially avoid breakage of the filaments. Screw or ball mixing processes, for example, should be avoided in the blending process. For other mixing or compounding processes, the shear should be suitably minimized to reduce filament breakage. In particular embodiments, a melt is formed and blended in a heated compounder device set at a low mixing speed, typically no more than or less than 30, 40, 50, 60, 70, 80, 90, or 100 revolutions per minute (rpm). Such low shear mixing speeds may also be achieved by blending the melt with a handheld or mounted mixing drill while the melt is heated by separate heating source.

In some embodiments, the melt includes one or more other components, particularly those additional components that may improve the physical properties of the melt and/or the final composite fiber. In particular embodiments, a plasticizer is included in the melt, typically to promote plasticity (i.e., fluidity), surface smoothness, and flexibility of the fibrous extrudate and to inhibit melt-fracture during the extrusion process. The one or more plasticizers included in the melt can be any of the plasticizers well known in the art and appropriate for the particular polymer being extruded. For example, in a first embodiment, the plasticizer may be a carboxy ester compound (i.e., an esterified form of a carboxylic or polycarboxylic acid), such as an ester based on succinic acid, glutaric acid, adipic acid, terephthalic acid, sebacic acid, maleic, dibenzoic acid, phthalic acid, citric acid, and trimellitic acid. In a second embodiment, the plasticizer may be an ester-, amide-, or ether-containing oligomer, such as an oligomer of caprolactam, wherein the oligomer typically contains up to or less than 10 or 5 units. In a third embodiment, the plasticizer may be a polyol (e.g., a diol, triol, or tetrol), such as ethylene glycol, diethylene glycol, triethylene glycol, glycerol, or resorcinol. In a fourth embodiment, the plasticizer may be a sulfonamide compound, such as N-butylbenzenesulfonamide, N-ethyltoluenesulfonamide, or N-(2-hydroxypropyl)benzenesulfonamide. In a fifth embodiment, the plasticizer may be an organophosphate compound, such as tributyl phosphate or tricresyl phosphate. In a sixth embodiment, the plasticizer may be an organic solvent. The organic solvent considered herein is a compound that helps to soften or dissolve the polymer and is a liquid at room temperature (i.e., a melting point of no more than about 10, 20, 25, or 30° C.). Depending on the type of polymer, the organic solvent may be, for example, any of those mentioned above (e.g., ethylene glycol or glycerol), or, for example, a hydrocarbon (e.g., toluene), ketone (e.g., acetone or butanone), amide (e.g., dimethylformamide), ester (e.g., methyl acetate or ethyl acetate), ether (e.g., tetrahydrofuran), carbonate (e.g., propylene carbonate), chlorohydrocarbon (e.g., methylene chloride), or nitrile (e.g., acetonitrile). In some embodiments, one or more classes or specific types of any of the above plasticizers are excluded from the melt. In some embodiments, the plasticizer or other auxiliary component may be removed from the extrudate by subjecting the extrudate to a post-bake process that employs a suitably high temperature capable of volatilizing the plasticizer or other auxiliary component.

Other components may be included in the melt in order to favorably affect the physical or other properties of the melt (before or during extrusion) or the final composite fiber. For example, an electrical conductivity enhancing agent, such as conductive carbon particles, may be included to provide a desired level of conductivity, if so desired. To suitably increase the rigidity of the extruded or final composite fiber, a hardening agent, such as a crosslinking agent, curing agent, or a filler (e.g., talc), may also be included. To improve or otherwise modify the interfacial interaction between the filaments and polymeric matrix, a surfactant or other interfacial agent may be included. To impart a desired level of magnetism to the final composite fiber, magnetic particles (e.g., magnetite) may be included. To impart a desired color to the final composite fiber, a coloring agent may also be included. In other embodiments, one or more classes or specific types of any the above additional components may be excluded from the melt.

By the above-described low shear extrusion process, the lengthwise dimensions of filaments in the extruded composite fiber are typically substantially aligned with the axial (i.e., lengthwise) direction of the composite fiber. The term "substantially aligned", as used herein, generally indicates a deviation from completely aligned (i.e., 0 degrees) of up to or less than 45, 30, or 15 degrees in at least 50%, 60%, 70%, 80%, 90%, or 95% of the filaments.

In another aspect, the invention is directed to an additive manufacturing process in which the above-described polymer composite fiber (extrudate) is used as a feed material in an additive processing device to produce an object made of the polymer composite fiber. The additive manufacturing process can be any of these additive processes well known in the art, particularly a rapid prototyping unit, such as a fused deposition modeling (FFF) device, or more particularly, a 3D printer. As well known in the art, the additive (particularly FFF or 3D printing process) generally operates by hot extruding the composite fiber through a die or nozzle of suitable shape and repeatedly depositing discrete amounts (e.g., beads) of the composite fiber in designated locations to build a structure. The temperature employed in the additive process is generally a temperature at which the composite fiber is extrudable but not in a completely melted state, i.e., a temperature below the melting temperature of the polymer. Upon exiting the die (i.e., nozzle) in the additive processing unit, the composite fiber material cools and solidifies. In the FFF or 3D printing process, the nozzle is moved in precise horizontal and vertical positions as beads of the composite fiber are deposited. The beads of composite fiber FFF and 3D printing processes typically build an object layer by layer in such fashion. The nozzle movements and flow rate of the composite fiber are generally controlled by computer software, typically a computer-aided manufacturing (CAM) software package. The FFF or 3D printer builds an object (article) based on instructions provided by a computer program that includes precise specifications of the object to be constructed. The object can have any suitable shape or function, particularly those in which a significant degree of mechanical strength is desired, including, for example, mechanical or structural components, which may find use in machines, automobiles, and tools.

Examples have been set forth below for the purpose of illustration and to describe certain specific embodiments of the invention. However, the scope of this invention is not to be in any way limited by the examples set forth herein.

EXAMPLE 1

Fused Filament Fabrication of ABS Matrix Containing Carbon Fibers

ABS resin was mixed with various weight fractions (10, 13, 20, 30, 40 wt. %) of carbon fibers, with S3 ABS resin serving as baseline (0 wt. % carbon fiber). Low shear mixing was conducted without the use of a screw. The melt mixed mass was then pushed through a barrel-plunger based low-shear extrusion device at 1 mm/min to 4 mm/min plunger speed. An extruded smooth composite thread was used in the 3D printing, and 3D-printed dog-bones were subsequently tested for their tensile properties.

Figure 2A:
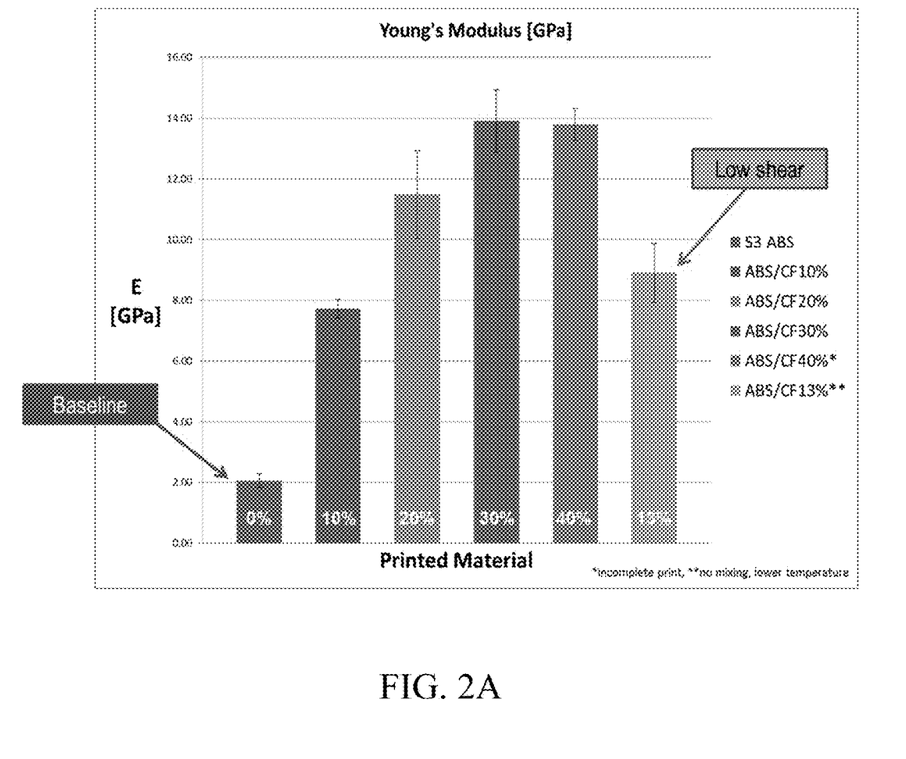
FIGS. 2A, 2B. Mechanical properties of carbon fiber ABS composite printed parts produced from high-shear extruded composites filaments and low-shear processed filaments: tensile modulus (FIG. 2A) and tensile strength (FIG. 2B).
Figure 2B:
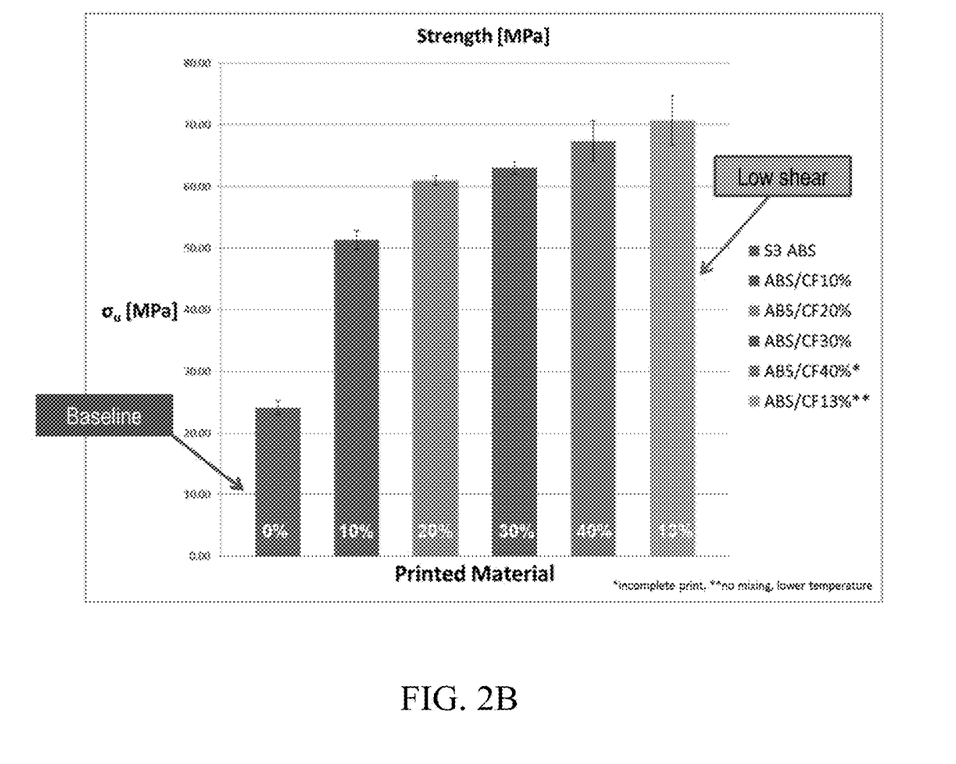

The tensile modulus data for the 3D printed parts are shown in FIG. 2A. As shown, with an increase in weight fraction of carbon fiber (CF) loading, the modulus of the printed parts increased. The tensile failure strength data of the specimens are shown in FIG. 2B. It is clear that, with increase in fiber loading, the tensile strength of the composites increased. In particular, FIG. 2B shows that the strength of 40 wt % carbon fiber-containing composites was higher than that of the 10 wt. % carbon fiber containing composite. These composites were fabricated by conventional high shear mixed material. The most surprising result in FIG. 2B is in the component made using the low-shear processed screw-less fused filament fabrication method with only 13 wt. % carbon fiber, which exhibited a tensile strength of 70 MPa, which is substantially higher than that of the 3D printed part containing 40 wt % carbon fiber (67 MPa) made by conventional melt-mixed composites.

While there have been shown and described what are at present considered the preferred embodiments of the invention, those skilled in the art may make various changes and modifications which remain within the scope of the invention defined by the appended claims.

What is claimed is:

1. A method for producing an object from a polymer composite fiber comprising a polymer matrix with filaments incorporated therein whose lengthwise dimensions are substantially oriented with the axial dimension of the composite fiber, the method comprising subjecting a melt comprising a polymer matrix and filaments homogeneously distributed throughout said polymer matrix to an extrusion process in which the melt is extruded into a fibrous form in the absence of screw extruders and in the substantial absence of shear forces that result in breakage of said filaments, followed by cooling and solidification of the extruded melt to provide the polymer composite fiber, wherein the polymer composite fiber, as produced above, is fed into an additive manufacturing unit to produce said object made of said polymer composite fiber by additive manufacturing.

2. The method of claim 1, wherein said melt is first produced by a compounding process in which polymer matrix material and filament material are mixed and heated to at least the melting point of the polymer matrix material to form said melt.

3. The method of claim 1, wherein the melt is extruded by a melt spinning process.

4. The method of claim 1, wherein the melt is extruded by pushing the melt through a die by means of a plunger that moves at a substantially fixed speed to provide a substantially constant pressure on the melt moving through the die.

5. The method of claim 1, wherein said polymer matrix has a composition comprising a polyamide, polyester, polyacrylonitrile, polyolefin, lignin, polycarbonate, polystyrene, polybutadiene, polyphenylsulfone, polyether, polybenzimidazole, viscose, rayon, pitch, or combination thereof.

6. The method of claim 1, wherein said polymer matrix is comprised of acrylonitrile-butadiene-styrene.

7. The method of claim 1, wherein said filaments are composed of carbon, metal oxide, or metal.

8. The method of claim 1, wherein said filaments are carbon filaments.

9. The method of claim 8, wherein said carbon filaments are selected from micron-sized carbon fibers, carbon nanofibers, carbon nanotubes, platelet nanofibers, and graphene nanoribbons.

10. The method of claim 1, wherein said filaments are coated with a sizing agent.

11. The method of claim 1, wherein said filaments are carbon filaments coated with an epoxy-based sizing agent.

12. The method of claim 1, wherein said filaments are included in an amount of at least 1 wt % and up to 40 wt %.

13. The method of claim 1, wherein said filaments are included in an amount of at least 5 wt % and up to 35 wt %.

14. The method of claim 1, wherein said filaments are included in an amount of at least 10 wt % and up to 30 wt %.

15. The method of claim 1, wherein said filaments have a length to diameter ratio of at least 10:1.

16. The method of claim 1, wherein said filaments have a length to diameter ratio of at least 100:1.

17. The method of claim 1, wherein said filaments have a length of at least 100 nm and up to 1 mm.

18. The method of claim 1, wherein said melt includes a plasticizer.

19. The method of claim 1, wherein said additive manufacturing unit is a rapid prototyping unit.

20. The method of claim 19, wherein said rapid prototyping unit is a 3D printer.

* * * * *